(12) United States Patent
Oskotsky et al.

(10) Patent No.: US 12,276,775 B2
(45) Date of Patent: Apr. 15, 2025

(54) WIDE ANGLE MWIR F-THETA LENS

(71) Applicant: BAE Systems Information and Electronic Systems Integration Inc., Nashua, NH (US)

(72) Inventors: Mark L. Oskotsky, Mamaroneck, NY (US); Michael J. Russo, Jr., Roslyn, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 693 days.

(21) Appl. No.: 16/625,206

(22) PCT Filed: Jun. 20, 2017

(86) PCT No.: PCT/US2017/038247
§ 371 (c)(1),
(2) Date: Dec. 20, 2019

(87) PCT Pub. No.: WO2018/236344
PCT Pub. Date: Dec. 27, 2018

(65) Prior Publication Data
US 2020/0142160 A1    May 7, 2020

(51) Int. Cl.
*G02B 13/00*      (2006.01)
*G02B 9/34*      (2006.01)
*G02B 13/14*      (2006.01)

(52) U.S. Cl.
CPC ......... *G02B 13/0005* (2013.01); *G02B 13/14* (2013.01); *G02B 9/34* (2013.01)

(58) Field of Classification Search
CPC .... G02B 13/0005; G02B 13/06; G02B 13/14; G02B 13/0045; G02B 13/008;
(Continued)

(56) References Cited

U.S. PATENT DOCUMENTS 4,400,063 A    9/1983   Hayashida
5,404,247 A    4/1995   Cobb et al.
(Continued)

FOREIGN PATENT DOCUMENTS

CN      104076490 A   *   10/2014
CN      104076490 B      10/2014
(Continued)

OTHER PUBLICATIONS

English translation of CN-104076490 (year 2014).*
(Continued)

*Primary Examiner* — Thomas K Pham
*Assistant Examiner* — Kuei-Jen L Edenfield
(74) *Attorney, Agent, or Firm* — Scott J. Asmus; Gary McFaline

(57) ABSTRACT

A wide angle MWIR F-theta lens with an F# of 2. The lens is deployed on airborne platforms for remote sensing applications. The lens is corrected for monochromatic and chromatic aberrations over the wavelength range 5000 nm-3300 nm. The image of the remote target is formed on a focal plane which may constitute CCD or CMOS with micro lenses. The lens comprises four groups of optical elements with a cold shield/aperture stop located behind the last group. One embodiment of the lens includes five types of optical materials and while another embodiment of the lens includes only two types of optical materials.

10 Claims, 6 Drawing Sheets

(58) Field of Classification Search
CPC .... G02B 13/0055; G02B 13/00; G02B 13/18; G02B 13/146; G02B 15/00; G02B 15/144513; G02B 15/177; G02B 9/34; G02B 9/18; G02B 9/38; G02B 9/28; G02B 9/32; G02B 9/64; G02B 5/005; G02B 5/00; G02B 13/04
USPC ..... 359/206.1, 350–357, 642, 662, 708–719, 359/744–753, 761–762, 770, 781–783
See application file for complete search history.

(56) References Cited

U.S. PATENT DOCUMENTS

| | | | |
|---|---|---|---|
| 5,446,581 A | 8/1995 | Jamieson | |
| 7,369,303 B2 | 5/2008 | Tejada | |
| 7,848,015 B2 | 12/2010 | Baker | |
| 8,237,842 B2 | 8/2012 | Wakamiya | |
| 8,339,717 B2 | 12/2012 | Li | |
| 8,462,438 B2 | 6/2013 | Yamamoto | |
| 9,025,256 B2 | 5/2015 | Cook | |
| 10,302,914 B2 * | 5/2019 | Chang | G02B 13/146 |
| 2002/0135869 A1 | 9/2002 | Banish et al. | |
| 2014/0126070 A1 * | 5/2014 | Ning | G02B 27/0018 359/740 |
| 2017/0059830 A1 | 3/2017 | Spencer et al. | |
| 2018/0088257 A1 * | 3/2018 | Ding et al. | G02B 3/0062 |

FOREIGN PATENT DOCUMENTS

| | | |
|---|---|---|
| CN | 104375261 A | 2/2015 |
| CN | 104808314 A | 7/2015 |

OTHER PUBLICATIONS

EP Search Report, EP17915135.2, mailed Mar. 2, 2021, 9 pages.

Kumler et al. "Fisheye lens designs and their relative performance", Proc. SPIE 4093, Current Developments in Lens Design and Optical Systems Engineering, 360 (Oct. 24, 2000).

International Search Report corresponding to PCT/US2017/038247 mailed on Sep. 1, 2017, 11 pages.

* cited by examiner

WIDE ANGLE MWIR F-THETA LENS

CROSS REFERENCE TO RELATED APPLICATION

This application is a US National Phase Application filed under 35 USC 371 of PCT Application No. PCT/US2017/038247 filed Jun. 20, 2017, and is herein incorporated by reference in its entirety for all purposes.

FIELD OF THE DISCLOSURE

The present disclosure relates to wide angle lenses, and more particularly to MWIR F-theta lenses used on airborne deployed platforms.

BACKGROUND OF THE DISCLOSURE

For an optical lens in the absence of distortion, the position of the focused spot is dependent on the product of the Effective Focal Length (EFL) and the tangent of the field of view (FOV) angle θ. When a lens is designed with built-in negative or barrel distortion, the position of the focused spot can then be made dependent on the product of EFL and θ, thereby simplifying a target position detection algorithm. Lenses designed this way are called F-theta lenses. F-theta lenses are used for scanning optical systems as well as for surveillance and reconnaissance applications for precise mapping of an observed target. For these applications, the lens must meet several requirements which do not necessarily apply to other applications.

F-theta lenses for scanning and mapping must provide good imaging over a wide field of view and must have high resolution and high transmission (i.e. have a low F#). In addition, the lens must be compact in order to be maintained on a remote sensor platform. The image at the focal plane should be flat and corrected for the field curvature. Mid wave infrared (MWIR) lenses are used for detecting radiation emitted by the target in the 5000 nm 3300 nm spectrum to detect the content of the target. Infrared lenses incorporate special cooled chambers with a cold shield positioned before them. These chambers are usually cooled to the same temperature as the focal plane/detector. Cold shields are used in IR optical devices for military, scientific, and industrial applications to protect IR sensors from stray IR radiation.

In one conventional system, as disclosed in U.S. Pat. No. 7,369,303, dual band mid wave infrared region (MWIR) and the long wave infrared region (LWIR) lenses with relatively small fields of view +/−22.5° are shown. The lens has a short distance to the detector with no cold shield and the detector is not cooled. This leads to low sensitivity for the detector and poor signal-to-noise ratio (SNR). A wide angle F-theta lens for use in the visible spectrum is described in "Fish-eye lens designs and their relative performance," Proc. SPIE 4093, Current Developments in Lens Design and Optical Systems Engineering, 360 (Oct. 24, 2000). There, lenses had an F# of 2.8, comprised many elements, and did not have a good lateral color correction.

Another example of F-theta lens is disclosed in U.S. Pat. No. 8,462,438. There, the lens has high resolution and is designed for the visible spectrum of 450-650 nm. Yet another F-theta lens is disclosed in U.S. Pat. No. 8,339,717. There, the lens is designed for the visible spectrum and has a high F#. Another F-theta lens is disclosed in U.S. Pat. No. 5,404,247 the lens was designed for the visible spectrum and had a color correction for the spectrum of 532 nm-488 nm.

Wherefore it is an object of the present disclosure to overcome the above-mentioned shortcomings and drawbacks associated with the prior art F-theta lenses. These aspects of the disclosure are not meant to be exclusive and other features, aspects, and advantages of the present disclosure will be readily apparent to those of ordinary skill in the art when read in conjunction with the following description and accompanying drawings.

SUMMARY OF THE DISCLOSURE

According to one embodiment of the present disclosure of a wide angle F-theta lens, the lens system includes in order from the object to the image plane a first optical group having a negative optical power, a second optical group having a negative optical power, a third optical group having a positive optical power, a fourth optical group having a positive optical power, a cold shield, and a focal plane array.

A first optical group includes one optical element having a negative optical power. The second optical group includes two optical elements having in order from the object to the image negative optical power and positive optical power correspondingly. The third optical group includes two optical elements having in order from the object to the image positive and negative optical powers. The fourth optical group includes two optical elements having in order from the object to the image negative and positive optical powers. A cold shield is the aperture stop of the lens and the distance from the cold shield to the image plane is about 75 mm. The image of the remote target is formed on a focal plane which may constitute CCD or CMOS with micro lenses.

The optical powers, the shapes of the optical elements, the refractive indices and dispersions of the optical element's materials allow cross field monochromatic and chromatic correction of aberrations in a spectrum of 5000 nm-3300 nm while achieving F-theta distortion correction.

One aspect of the present disclosure is a wide angle MWIR F-theta lens comprising in order from the object to the image plane: a first optical group having a negative optical power; a second optical group having a negative optical power; a third optical group having a positive optical power; a fourth optical group having a positive optical power; a cold shield; and a focal plane array; wherein the lens is corrected over the spectral waveband of about 5000 nm to about 3300 nm; the first optical group is configured to receive the light from a remote object and to direct diverged light onto the second optical group; the first optical group includes a single optical element; the second optical group is configured to diverge the light from the first optical group and to direct diverged light onto the third optical group; the second optical group includes two optical elements having in order from the object to the image negative optical power and positive optical power; the third optical group is configured to converge light from the second optical group and to direct light onto the fourth optical group; the third optical group includes two optical elements having in order from the object to the image positive and negative optical powers; the fourth optical group is configured to converge light from the third optical group and focus light onto the focal plane; the fourth optical group includes two optical elements having in order from the object to the image negative and positive optical power; and the cold shield is the aperture stop and is positioned between the last element of the lens and the focal plane.

In certain embodiments, the wide angle MWIR F-theta lens of claim 1, wherein $-0.55 < F'1/F'10 < -0.45$; $1.75 < F'10/F'20 < 1.95$; $-2.10 < F'10/F'30 < -1.75$; $-0.95 < F'10/F'40 < -$ 0.75; $1.10<n11/n21<1.30$, $1.65<n21/n22<1.35$; $1.05<n31/n32<1.25$; $0.95<n11/n41<1.15$; $0.95<n21/n42<1.15$; $0.35<V11/V21=V41/V42<0.45$; $1.90<V21/V22<2.25$; $0.70<V22/V31<0.90$; $0.75<V31/V32<0.95$, $2.60<OAL/CSD<2.75$; wherein: F'1 is a focal length of the lens; F'10, F'20, F'30 and F'40 are focal lengths of the first, the second, the third and the fourth optical groups; n11 is a refractive index for a first element of the first optical group; n21 and n22 are refractive indices for a first and a second optical element of the second optical group; n31 and n32 are refractive indices for a first and a second optical element of the third optical group; n41 and n42 are refractive indices for a first and a second optical element of the fourth optical group; V11 is an Abbe number for the first optical element of the first optical group; V21 and V22 are Abbe numbers for the first and second optical elements of the second optical group; V31 and V32 are Abbe numbers for the first and second optical elements of the third optical group; V41 and V42 are Abbe numbers for the first and second optical elements of the fourth optical group; OAL is the overall length of the lens; and CSD is the distance from the cold shield to the image plane.

In some cases, the first optical element of the first optical group is made in a form of a negative meniscus whose concave surface faces toward the image and a second surface of the first optical element of the first optical group is formed aspherical.

In certain embodiments, the first optical element of the first optical group is made out of Germanium; the first optical element of the second optical group is made out of Silicon and the second optical element of the second optical group is made out of ZnS In some cases, the first optical element of the third optical group is made out of CdTe and the second optical element of the third optical group is made out of ZnSe. In some cases, the first optical element of the fourth optical group is made out of Germanium and the second optical element of the fourth optical group is made out of Si.

In other embodiments, the first optical element and the second optical element of the second optical group both are made in a form of meniscuses whose concave surfaces faces toward the image and the second surface of the first optical element of the second optical group is formed aspherical.

In yet other embodiments of the wide angle MWIR F-theta lens the first optical element of the third optical group is in a form of a double convex lens and the second optical element of the third optical group is in a form of a negative meniscus whose concave surface faces toward the object and the first surface of the second optical element of the third optical group is formed aspherical.

In yet other embodiments of the wide angle MWIR F-theta lens the first optical element of the fourth optical group is in a form of a double concave lens and the second optical element of the fourth optical group is in a form of a negative meniscus whose concave surface faces toward the object and the first surface of the first optical element of the fourth optical group is formed aspherical. In certain cases, the distance from the cold shield to the image plane is about 75 mm, the lens has a field of view of about 63° vertical by about 126° horizontal and has an F# of 2.

Another aspect of the present disclosure is a wide angle MWIR F-theta lens comprising in order from the object to the image plane: a first optical group having a negative optical power; a second optical group having a positive optical power; a third optical group having a negative optical power; a fourth optical group having a positive optical power; a cold shield; and a focal plane array; wherein the lens is corrected over the spectral waveband of about 5000 nm to about 3300 nm; the first optical group is configured to receive the light from the remote object and to direct diverged light onto the second optical group; the first optical group includes a single optical element; the second optical group is configured to converge the light from the first optical group and to direct diverged light onto the third optical group; the second optical group includes two optical elements having in order from the object to the image negative optical power and positive optical power; the third optical group is configured to diverge light from the second optical group and to direct light onto the fourth optical group; the third optical group includes one optical element; the fourth optical group is configured to converge light from the third optical group and focus light onto the focal plane; the fourth optical group includes four optical elements having in order from the object to the image positive, positive, negative, and positive optical powers; and the cold shield is the aperture stop and is positioned between the last element of the lens and the focal plane.

In certain embodiments of the wide angle MWIR F-theta lens $-0.70<F'2/F'100<-0.55$; $-0.55<F100/F'200<-0.40$; $0.55<F'100/F'300<0.75$; $-1.3<F'100/F'400<-0.90$; $1.10<n101/n201<1.35$; $0.75<n201/n202<0.95$; $1.10<n101/n301<1.35$; $1.10<n101/n401<1.35$; $0.95<n401/n402<1.15$; $0.75<n402/n403<0.95$; $1.10<n403/n404<1.35$; $0.35<V101/V201=V101/V301=V101/V401=V101/V402=V101/V404<0.45$; $0.95<V101/V202=V101/V403<1.15$; $2.60<OAL/CSD<2.75$; wherein: F'2 is a focal length of the lens; F'100, F'200, F'300 and F'400 are focal lengths of the first, the second, the third, and the fourth optical groups; n101 is a refractive index for a first element of the first optical group; n201 and n202 are refractive indices for a first and a second optical element of the second optical group; n301 is a refractive index for an optical element of the third optical group; n401, n402, n403, n404 are refractive indices for a first, a second, a third, and a fourth optical element of the fourth optical group; V101 is an Abbe number for the first optical element of the first optical group; V201 and V202 are Abbe numbers for the first and the second optical elements of the second optical group; V301 is an Abbe number for the optical element of the third optical group; V401, V402, V403 and V404 are Abbe numbers for the first, the second, the third, and the fourth optical elements of the fourth optical group; OAL, is the overall length of the lens; and CSD is the distance from the cold shield to the image plane.

In some cases, the lens utilizes only two optical materials, Germanium and Silicon. In some cases, the first optical element of the first optical group is made out of Germanium, the first optical element of the second optical group is made out of Si and the second optical element of the second optical group is made out of Germanium. In certain cases, the optical element of the third optical group is made out of Si; the first optical element of the fourth optical group is made out of Si, the second optical element of the fourth optical group is made out of Si, the third element of the fourth optical group is made out of Germanium and the fourth element of the fourth optical group is made out of Si.

In certain embodiments, the first optical element of the first optical group is made in a form of a negative meniscus whose concave surface faces toward the image. In some cases, the first optical element of the second optical group is made in a form a double concave lens and the second optical element of the second optical group is made in a form of a positive meniscus whose concave surface faces toward the image and the second surface of the first optical element of the second optical group is formed aspherical.

In certain embodiments of the wide angle MWIR F-theta lens, the optical element of the third optical group is formed as a negative meniscus whose concave surface faces toward the object and the first surface of the optical element of the third optical group is formed aspherical.

In other embodiments, the first optical element of the fourth optical group is in a form of a double convex lens, the second optical element of the fourth optical group is in a form of a positive meniscus whose concave surface faces toward the object, the third optical element of the fourth optical group is made in a form of a double concave lens and the fourth optical element of the fourth optical group is made in a form of a positive meniscus whose concave surface faces toward the object. In yet other embodiments, the first surface of the first optical element of the fourth optical group is formed aspherical. In some cases, the distance from the cold shield to the image plane is about 76.2 mm and the lens has an F# of 2.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1A:
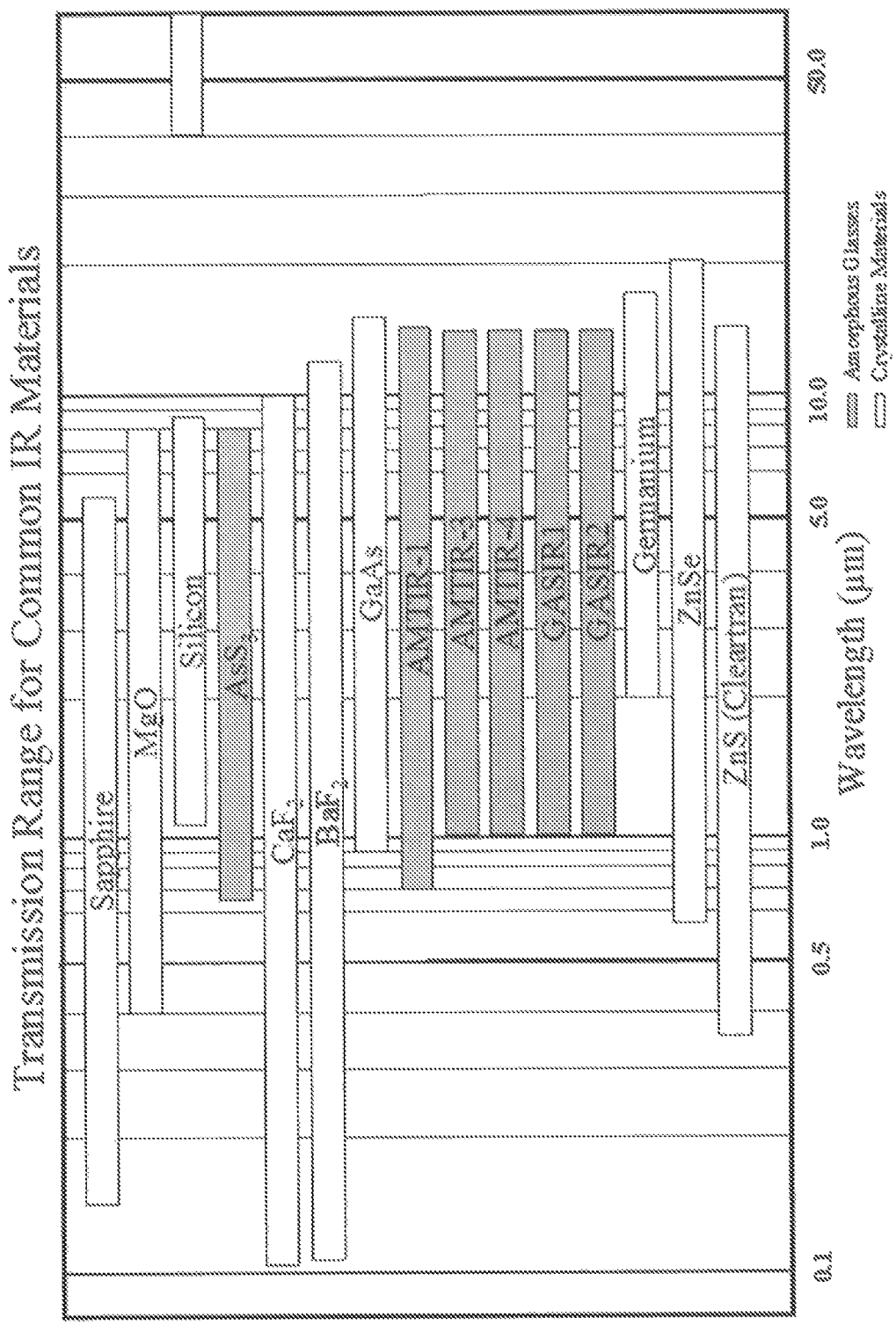
FIG. 1A shows a number of available MWIR spectrum materials.

A wide angle MWIR F-theta lens with F#2 and angular field of view 63° vertical×126° horizontal for a first embodiment and 74° vertical×144° horizontal for a second embodiment are disclosed herein. The lens is deployed on airborne platforms for remote sensing applications. The lens is corrected for monochromatic and chromatic aberrations over the wavelength range 5000 nm-3300 nm. In the first and second embodiments the focal length is 34.1 and 33.3 mm, respectively. The image of the remote target is formed on a focal plane which may constitute CCD or CMOS with micro lenses.

In certain embodiments the lens comprises four groups of optical elements with a cold shield/aperture stop located behind the last group at a distance of about 75 mm to the image plane for the first embodiment and about 76.2 mm for the second embodiment. In the first embodiment the first optical group includes a single element, the second group includes two elements, the third group includes two elements and the fourth group includes two elements. In a second embodiment the first group includes a single element, the second group includes two elements, the third group includes a single element and the fourth group includes four elements. It is understood that the number of elements may vary and still be in keeping with the principles of the present disclosure.

In a first embodiment the lens overall length is about 200 mm and in a second embodiment the lens overall length is about 250 mm. Certain embodiments include five types of optical materials and other embodiments include only two types of optical materials. In these cases, the lenses have an F# of 2.

For an optical lens in the absence of distortion, the position of the focused spot is dependent on the product of the Effective Focal Length (EFL) and the tangent of the field of view (FOV) angle θ. When a lens is designed with built-in negative or barrel distortion, the position of the focused spot can then be made dependent on the product of EFL and θ, thereby simplifying a target position detection algorithm. Lenses designed this way are called F-theta lenses. F-theta lenses are used for scanning optical systems as well as for surveillance and reconnaissance applications for precise mapping of an observed target. For these applications, the lens must meet several requirements which do not necessarily apply to other applications.

When chromatic aberration is not corrected, each wavelength is focused at a different point along the optical axis. If the optical system is achromatized the bandwidth's outer wavelengths have a common focus. The primary axial color is the difference between the focus positions of the outer wavelengths. Axial color has to be corrected to achieve good image quality. Optical element material types and lens optical powers have to be selected to compensate for the axial color.

When the primary color is corrected, the remaining chromatic aberration is referred to as a secondary color. Secondary color is the difference between focus points for the outer wave lengths and the central wavelength. Secondary color is the limiting axial aberration in a lens design and may be a dominating aberration for high resolution lenses used in aerial photography and mapping.

Monochromatic and chromatic aberrations depend on the heights and angles of rays at the optical element surface and refraction index of the material. Aberrations also depend on the shape of the optical element and its location with respect to the aperture stop. The contribution of the optical element to the total axial color is proportional to the square of axial marginal ray height at the lens, its optical power, and it is reciprocal of Abbe number of lens material.

The Abbe number, $V_{\lambda 2}$, though the definite width of the spectrum is given by $$V_{\lambda 2} = (n_{\lambda 2} - 1)/(n_{\lambda 1} - n_{\lambda 3})$$

where $n_{\lambda 2}$ is the index of refraction of the optical element material at the medium wavelength λ2 of the required spectrum, n λ1 is the index of refraction at shortest wavelength of the spectrum and n λ3 is the index of refraction at the longest wavelength λ3 of the spectrum. The smaller the value of $V_{\lambda 2}$ the greater the chromatic dispersion of the optical element material.

Common optical element materials used for MWIR applications include Germanium, Silicon, ZnSe, ZnS, Cleartran, AMTIR, Infrared Chalcogenide glasses, CdTe, CaF2, and the like. The fewer the number of optical element materials used in a system the better it is for production. On the other hand correction of the chromatic aberration, especially for the wide spectrum, requires a combination of different optical element materials with a certain match of chromatic dispersions.

Referring to FIG. 1A, a number of available MWIR spectrum materials are shown.

Figures 1B, 1C:
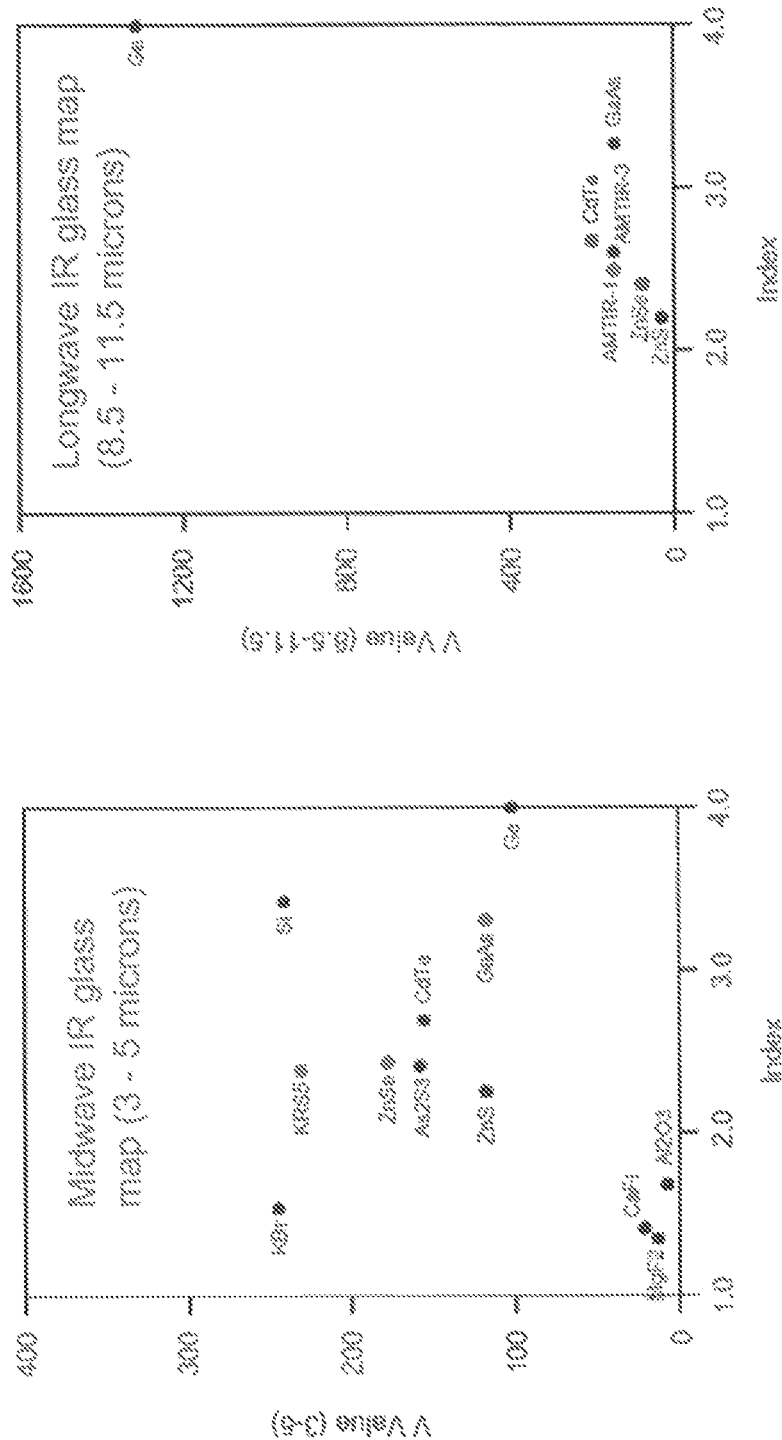
FIGS. 1B and 1C show dispersion values for several available MWIR materials.

Referring to FIG. 1B and FIG. 1C, dispersion values for several MWIR materials are shown. In FIG. 1B, Germanium has a V value of about 100 in the MWIR spectrum and Silicon has a V value of about 250. The color correction must be accomplished with matching different dispersions to the different optical powers. The lack of materials can make this task difficult, along with the generally inability to fabricate cemented doublets in the infrared, Usually Silicon is used for positive optical power elements and Germanium is used for negative optical power elements.

Monochromatic and chromatic aberrations correction is complicated for the MWIR spectrum of 3300 nm to 5000 nm wavelengths. According to the industry demands such lens is supposed to have a low F#2 and highest resolution of about 6 μm.

Another demand for these lenses is a large angular field of view (FOV) which varies depending on the different mapping and surveillance requirements, for example: vertical FOV 63° and horizontal 126°; vertical FOV 63.4° and horizontal 63.4°; vertical FOV 48° and horizontal 96°; vertical FOV 74° and horizontal 144°; and vertical FOV 48° and horizontal 48°. These fields of view are dependent on the airborne platform where the lens is deployed, on the method of surveillance, and on the focal plane/detector resolution. The distance from the cold shield to the focal plane shall be at least 75 mm in order to meet the current industry standard dimensions for the cooled Dewar/focal plane assembly.

One embodiment of the present disclosure comprises a wide angle MWIR F-theta lens which has a low F# of 2, high resolution of 6 μm, and is corrected for monochromatic and chromatic aberrations. This lens is recommended to be deployed at the airborne platforms for remote sensing applications.

Figure 2:
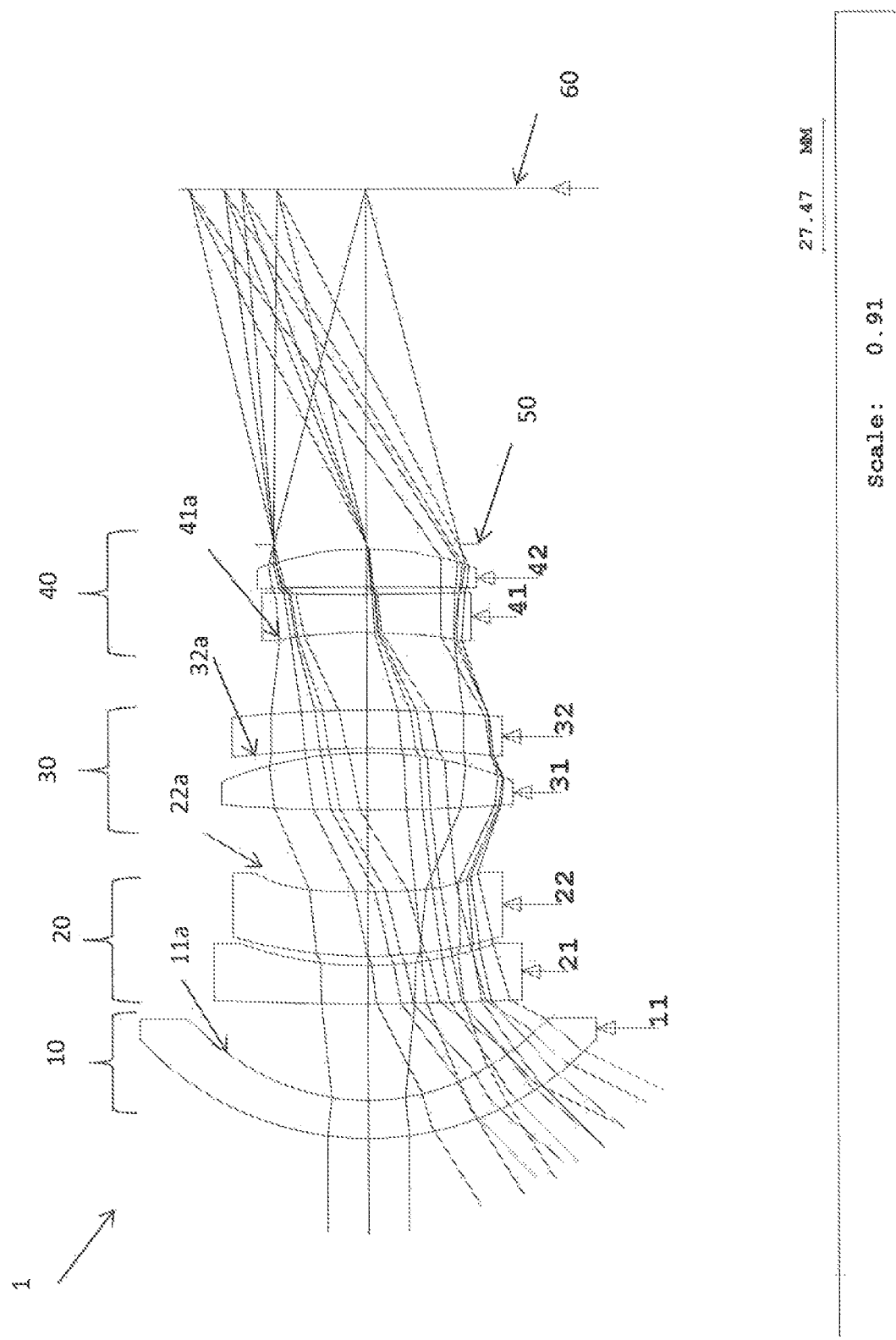
FIG. 2 shows a first embodiment of the lens according to the invention.

FIG. 2 shows a first embodiment of a wide angle MWIR F-theta lens 1 according to the present disclosure. The lens includes a first optical group 10, a second optical group 20, a third optical group 30, a fourth optical group 40, a cold shield 50 and a focal plane array 60. The cold shield 50 is the aperture stop of the lens. The image of the remote target is thrived on a focal plane 60 which may constitute CCD or CMOS with micro lenses.

Exemplary specifications for this lens are as follows:

| | |
|---|---|
| MWIR WL | 5000 nm-3300 nm |
| F# | 2 |
| Pixel size | 6 μm |
| IFOV | 180 μrad |
| EFL | 6 μm/180 μrad = 33.33 mm |
| Image size vertical | 3 rows × 2048 pixels × 6 μm pixel = 36.9 mm |
| Image size horizontal | 6 rows × 2048 pixels × 6 μm pixel = 73.8 mm |
| Distortion | F-Theta |
| Angular Full FOV vertical | (36.9 mm/33.33 mm) × 57.3° = 63° |
| Angular Full FOV horizontal | (73.8 mm/33.33 mm) × 57.3° = 126° |
| MTF | >0.15 cross field, edge point > 0.1 half Nyquist |
| OAL | 200 mm |

Still referring to FIG. 2, the first optical group 10 has an overall negative optical power and is configured to receive light from the remote object and to direct the diverged light onto the second optical group 20. In certain embodiments, the first group 10 includes only one optical element 11 having a negative optical power and is made in a form of a meniscus whose concave surface faces toward the image. The second surface 11a of the first element 11 is formed aspherical in order to correct for the spherical aberration and low order distortion across the field. In some cases, element 11 is made out of Germanium.

The second optical group 20 has a negative overall optical power and is configured to further diverge the light from the first optical group 10 and to direct diverged light onto the third optical group 30. The second optical 20 group includes two optical elements 21 and 22 having in order from the object to the image plane negative optical power and positive optical power, respectively. The first optical element 21 and the second optical element 22 of the second optical group 20 both are made in a form of a meniscus whose concave surfaces face toward the image. The first element 21 of the second optical group 20 is made out of Silicon and the second optical element 22 of the second optical group 20 is made out of ZnS. The mutual configuration and choice of optical element materials of the second optical group elements allow for correction of chromatic aberration and low order coma. The second surface 22a of the second optical element 22 is formed aspherical to compensate for the high order coma and astigmatism.

The third optical group 30 has an overall positive optical power and is configured to converge the light from the second optical group 20 and to direct the light onto the fourth optical group 40. The third optical group 30 includes two optical elements having in order from the object to the image positive and negative optical powers. The first optical element 31 of the third optical group 30 is in a form of a double convex lens made out of CdTe. The second optical element 32 of the third optical group 30 is in a form of a negative meniscus whose concave surface faces toward the object and is made out of ZnSe. The first surface 32a of a second element 32 is formed aspherical in order to compensate for the residual coma and high order astigmatism. The mutual configuration and choice of optical element materials of the third optical group elements allows for further correction of axial and lateral chromatic aberration.

The fourth optical group 40 has an overall positive optical power and is configured to further converge the light from the third optical group 30 and focus the light onto the focal plane 60. The fourth optical group 40 includes two optical elements having in order from the object to the image negative and positive optical powers correspondingly. The first optical element 41 of the fourth optical group 40 is in a form of a double concave lens made out of Germanium. The second optical element 42 of the fourth optical group 40 is in a form of a negative meniscus whose concave surface faces toward the object and is made out of Si. The first surface 41a of the first element 41 is formed aspherical in order to compensate for the residual high order distortion. The mutual configuration and choice of optical element materials of the fourth optical group elements allows for correction of the residual chromatic aberration, distortion and astigmatism.

The cold shield 50 is positioned between the last element 42 and the focal plane 60. The distance from the cold shield 50 to the image plane is about 75 mm. The cold shield is the aperture stop for the lens 1.

The form of asphere surfaces is as follows:

$$z = 1 + \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$

Where:
- z=the sag of the surface parallel to the z-axis
- c=the curvature at the pole of the surface (CUY)
- k=the conic constant (K)
- A, B, C, D, E, F, G, H, and J=the $4^{th}$, $6^{th}$, $8^{th}$, $10^{th}$, $12^{th}$, $14^{th}$, $16^{th}$, $18^{th}$, and $20^{th}$ order deformation coefficients, respectively (A=B=C=D=E=F=G=H=J=0 yields a pure conic surface)

| | |
|---|---|
| r = the radical distance = $\sqrt{x^2+y^2}$ | |
| k = 0 | Sphere |
| −1 < k < 0 | Ellipsoid with major axis on the optical axis (prolate spheroid) |
| k = −1 | Paraboloid |
| k < −1 | Hyperboloid |
| Also, k = −$e^2$ | |
| For k > 0 | Oblate spheroid (not a conic section) the surface is generated by rotating an ellipse about its minor axis and |
| $k = \frac{e^2}{(1-e^2)}$ | |
| | where e is the eccentricity of the generating ellipse |

The following relations among the optical groups 10, 20, 30, 40 and their constituent optical elements have been found to achieve monochromatic and chromatic aberrational correction cross field and F-theta distortion dependence.

$-0.55 < F'_1/F'_{10} < -0.45$
$1.75 < F'_{10}/F'_{20} < 1.95$
$-2.10 < F'_{10}/F'_{30} < -1.75$
$-0.95 < F'_{10}/F'_{40} < -0.75$
$1.10 < n_{11}/n_{21} < 1.30$
$1.65 < n_{21}/n_{22} < 1.35$
$1.05 < n_{31}/n_{32} < 1.25$
$0.95 < n_{11}/n_{41} < 1.15$
$0.95 < n_{21}/n_{42} < 1.15$
$0.35 < V_{11}/V_{21} = V_{41}/V_{42} < 0.45$
$1.90 < V_{21}/V_{22} < 2.25$
$0.70 < V_{22}/V_{31} < 0.90$
$0.75 < V_{31}/V_{32} < 0.95$
$2.60 < OAL/CSD < 2.75$ wherein:
- $F'_1$ is the focal length of the lens 1;
- $F'_{10}$, $F'_{20}$, $F'_3$ and $F'_{40}$ are the focal lengths of the first, the second, the third, and the fourth optical groups 10, 20, 30, and 40, respectively;
- $n_{11}$ is the refractive index for element 11 of the first optical group 10;
- $n_{21}$ and $n_{22}$ are refractive indices for the optical elements 21 and 22 of the second optical group 20;
- $n_{31}$ and $n_{32}$ are refractive indices for the optical elements 31 and 32 of the third optical group 30;
- $n_{41}$ and $n_{42}$ are refractive indices for the optical elements 41 and 42 of the fourth optical group 40;
- $V_{11}$ is the Abbe number for the optical element 11 of the first optical group 10;
- $V_{21}$ and $V_{22}$ are the Abbe numbers for the optical elements 21 and 22 of the second optical group 20;
- $V_{31}$ and $V_{32}$ are the Abbe numbers for the optical elements 31 and 32 of the third optical group 30;
- $V_{41}$ and $V_{42}$ are the Abbe numbers for the optical elements 41 and 42 of the fourth optical group 40;
- OAL is the overall length of the lens 1; and
- CSD is the distance from the cold shield 50 to the image plane 60.

In certain embodiments, mutual combination of refractive indices and dispersions of the optical elements of the optical groups 10, 20, 30 and 40 allows achieving F-theta distortion dependence, chromatic correction of the lens 1, and high resolution while having wide angle of FOV, and the desired distance of about 75 mm from the cold shield to the image plane.

The F# of this F-theta high resolution lens is 2 and the FOV is 63° vertical×126° horizontal. The overall length of this lens is 200 mm making this embodiment very compact. This embodiment also utilizes five optical materials.

Figure 3:
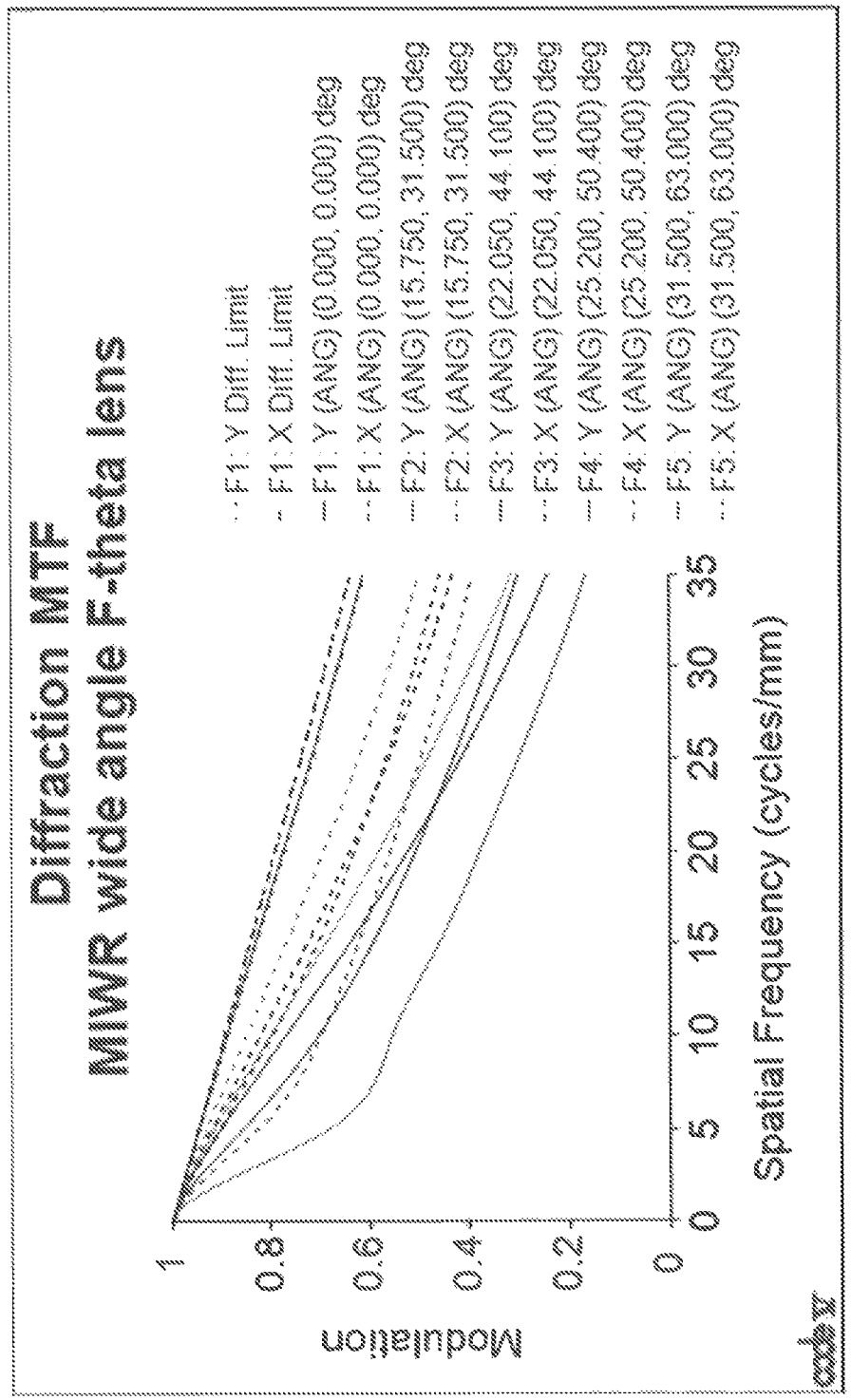
FIG. 3 shows the modulation transfer function data for the first embodiment.

The modulation transfer function (MTF) for the embodiment of FIG. 2 is presented in FIG. 3.

A table listing the properties of the optical elements for the first embodiment is presented below.

| Surface # | Radius | Thickness | Glass |
|---|---|---|---|
| >OBJ: | INFINITY | INFINITY | |
| 1: | 64.40734 | 8.000000 | GERMMW_SPECIAL |
| 2: | 46.98062 | 20.456288 | |
| | Aspherical coefficients: | | |
| | K: 0.000000 | | |
| A: 0.947769E−08; B: −0.104409E−08; C: 0.179241E−11; D: −0.210370E−14; E: 0.116268E−17; and F: −0.282848E−21 | | | |
| 3: | 768.06966 | 8.000000 | SILICON_SPECIAL |
| 4: | 77.50211 | 2.035449 | |
| 5: | 97.00284 | 13.583.227 | ZNS_SPECIAL |
| 6: | 206.23242 | 17.168698 | |
| | Aspherical coefficients: | | |
| | K: 0.000000 KC: | | |
| A: 0.627040E−05; B: 0.190811E−08; C: 0.998871E−11; D: −0.557066E−14; E; −0.360524E−17 and F: 0.125685E−20 | | | |
| 7: | 409.87963 | 12.000000 | CDTE_SPECIAL |
| 8: | −79.72465 | 1.000000 | |
| 9: | −173.80805 | 8.000000 | ZNSE_SPECIAL |

-continued

| Surface # | Radius | Thickness | Glass |
|---|---|---|---|
| Aspherical coefficients | | | |
| K: 0.000000 A: 0.602764E−06; B: 0.276977E−09; C: −0.654265E−13; D: 0.643678E−16; E: −0.901413E−19; and F: −0.999898E−24 | | | |
| 10: | −262.06412 | 16.221828 | |
| 11: | −121.00417 | 8.000000 | GERMMW_SPECIAL |
| Aspherical coefficients | | | |
| K: 3.071462 KC: 0 A: −0.367622E−06; B: −0.403719E−10; C: −0.163897E−12; D: and 0.150234E−16 | | | |
| 12: | 601.51730 | 1.565389 | |
| 13: | −988.25309 | 8.000000 | SILICON_SPECIAL 0 |
| 14: | −66.13298 | 1.000000 | |
| Aperture stop | INFINITY | 75.000000 | |
| IMG: | INFINITY | −0.030880 | |

Figure 4:
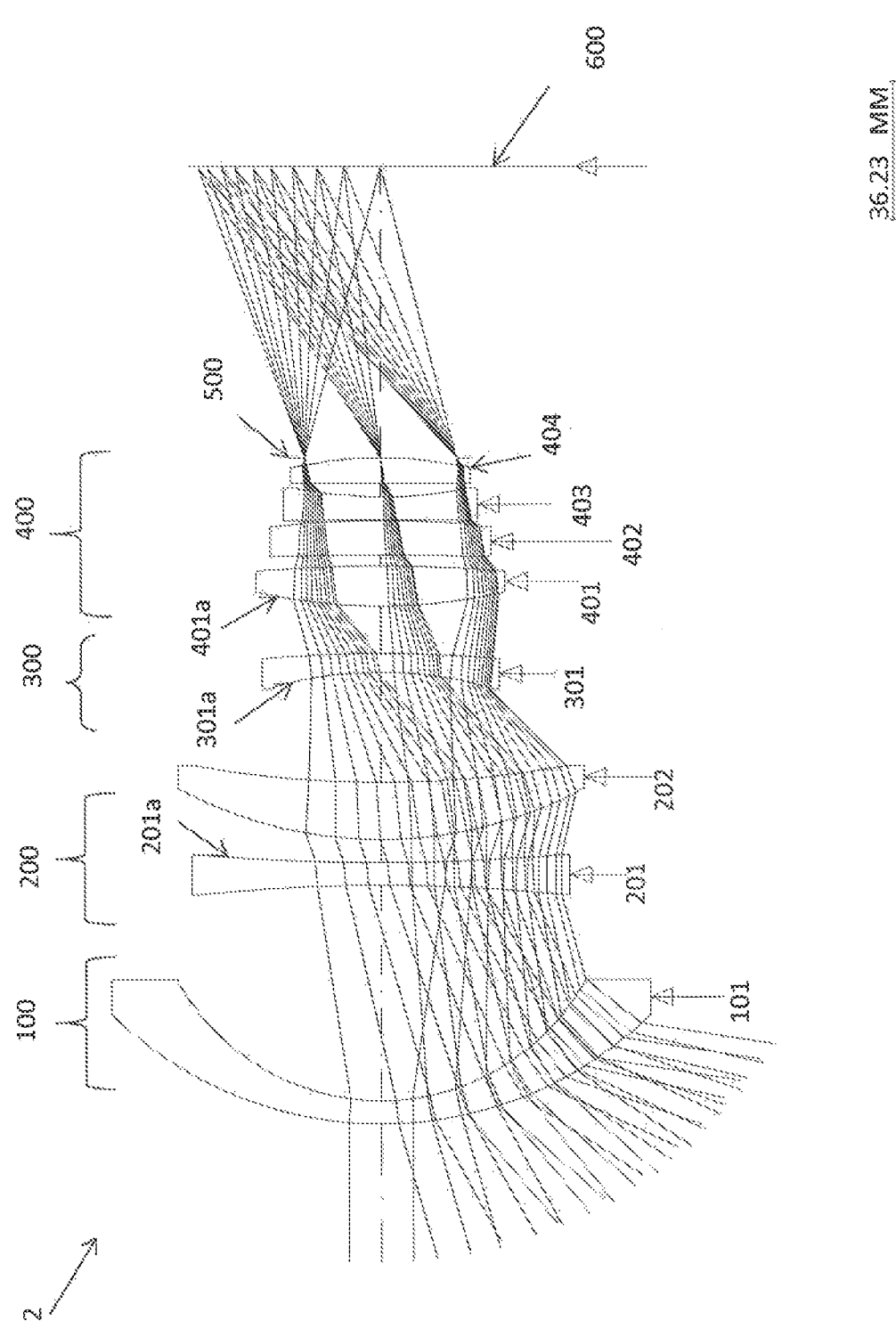
FIG. 4 shows a second embodiment of the lens according to the invention.

FIG. 4 shows a second embodiment of the wide angle MWIR F-theta lens 2 of the present disclosure. The lens includes a first optical group 100, a second optical group 200, a third optical group 300, a fourth optical group 400, a cold shield 500, and a focal plane array 600. The cold shield 500 is the aperture stop of the lens 2. The image of the remote target is formed on a focal plane 600 which may constitute CCD or CMOS with micro lenses.

Exemplary specifications for this lens are as follows:

| | |
|---|---|
| MWIR WL | 5000 nm-3300 nm |
| F# | 2 |
| Pixel size | 6 μm |
| IFOV | 180 μrad |
| EFL | 6 μm/180 μrad = 33.33 mm |
| Image size vertical | 3 rows × 2048 pixels × 6 μm pixel = 36.9 mm |
| Image size horizontal | 6 rows × 2048 pixels × 6 μm pixel = 73.8 mm |
| Distortion | F-Theta |
| Angular Full FOV vertical | (36.9 mm/33.33 mm) × 57.3° = 63° |
| Angular Full FOV horizontal | (73.8 mm/33.33 mm) × 57.3° = 126° |
| MTF | >0.3 cross field, edge point > 0.1 half Nyquist |
| OAL | 250 mm |

Still referring to FIG. 4, the first optical group 100 has an overall negative optical power and is configured to receive the light from the remote object and to direct the diverged light onto the second optical group 200. The first group 100 includes a single optical element 101 having a negative optical power and is in the form of a meniscus whose concave surface faces toward the image. Element 101 is made out of Germanium.

The second optical group 200 has a positive overall optical power and is configured to converge the light from the first optical group 100 and to direct the converged light onto the third optical group 300. The second optical group 200 includes two optical elements 201 and 202 having in order from the object to the image negative optical power and positive optical power, respectively. The first optical element 201 of the second optical group 200 is made in a form of a double concave lens. The second optical element 202 of the second optical group 200 is made in a form of a positive meniscus whose concave surface faces toward the image. The first element 201 of the second optical group 200 is made out of Si and the second optical element 202 of the second optical group 200 is made out of Germanium.

The mutual configuration and choice of the optical element materials of the second optical group elements allows for correction of longitudinal chromatic aberration and low order spherical aberration. The second surface 201a of the first optical element 201 is formed aspherical to compensate for the high order spherical aberration and coma.

The third optical group 300 has an overall negative optical power and is configured to diverge the light from the second optical group 200 and to direct the light onto the fourth optical group 400. The third optical group 300 includes one optical element 301 which is formed as a negative meniscus whose concave surface faces toward the object. The material of the element 301 is Si. The first surface 301a of optical element 301 is formed aspherical in order to compensate for the high order astigmatism and residual field curvature.

The fourth optical group 400 has an overall positive optical power and is configured to converge the light from the third optical group 300 and focus the light onto the focal plane 600. The fourth optical group 400 includes four optical elements having in order from the object to the image positive, positive, negative, and positive optical powers, respectively. The first optical element 401 of the fourth optical group 400 is in the form of a double convex lens and is made out of Si. The second optical element 402 of the fourth optical group 400 is in the form of a positive meniscus whose concave surface faces toward the object, and element 402 is made out of Si. The third optical element 403 of the optical group 400 is made in the form of a double concave lens. The third optical element is made out of Germanium. The fourth optical element 404 of the fourth optical group 400 is made in the form of a positive meniscus whose concave surface faces toward the object. The material for the fourth optical element 404 is Si. The first surface 401a of the first element 401 is formed aspherical in order to compensate for the high order field curvature, residual distortion and coma. The mutual configuration and choice of optical element materials of the fourth optical group elements allows for correction of the chromatic aberration, distortion, coma and astigmatism.

The cold shield 500 is positioned between the last element 404 and the focal plane 600. The distance from the cold shield 500 to the image plane is about 76.2 mm. The cold shield is the aperture stop for the lens 2.

The following relations among the optical groups 100, 200, 300, 400 and their constituent optical elements have been found to achieve monochromatic and chromatic aberrational correction cross field and F-theta distortion dependence.

$-0.70 < F'_2/F'_{100} < -0.55$ $-0.55 < F'_{100}/F'_{200} < -0.40$ $0.55 < F'_{100}/F'_{300} < 0.75$ $-1.3 < F'_{100}/F'_{400} < -0.90$ $1.10 < n_{101}/n_{201} < 1.35$ $0.75 < n_{201}/n_{202} < 0.95$ $1.10 < n_{101}/n_{301} < 1.35$ $1.10 < n_{101}/n_{401} < 1.35$ $0.95 < n_{401}/n_{402} < 1.15$ $0.75 < n_{402}/n_{403} < 0.95$ $1.10 < n_{403}/n_{404} < 1.35$ $0.35 < V_{101}/V_{201} = V_{101}/V_{301} = V_{101}/V_{401} = V_{101}/V_{402} = V_{101}/V_{404} < 0.45$ $0.95 < V_{101}V_{202} = V_{101}/V_{403} < 1.15$ $2.60 < OAL/CSD < 2.75$ wherein:

$F'_2$ is the focal length of the lens 2;

$F'_{100}$, $F'_{200}$, $F'_{300}$ and $F'_{400}$ are the focal lengths of the first, the second, the third, and the fourth optical groups 100, 200, 300 and 400;

$n_{101}$ is the refractive index for the element 101 of the first optical group 100;

$n_{201}$ and $n_{202}$ are the refractive indices for the optical elements 201 and 202 of the second optical group 200;

$n_{301}$ is the refractive indices for the optical element 301 of the third optical group 300;

$n_{401}$, $n_{402}$, $n_{403}$, $n_{404}$ are the refractive indices for the optical elements 401, 402, 403, and 404 of the fourth optical group 400;

$V_{101}$ is the Abbe number for the optical element 101 of the first optical group 100;

$V_{201}$ and $V_{202}$ are the Abbe numbers for the optical elements 201 and 202 of the second optical group 200;

$V_{301}$ is the Abbe number for the optical element 301 of the third optical group 300;

$V_{401}$, $V_{402}$, $V_{403}$ and $V_{404}$ are the Abbe numbers for the optical elements 401, 402, 403, and 404 of the fourth optical group 400;

OAL is the overall length of the lens; and

CSD is the distance from the cold shield to the image plane.

The mutual combination of refractive indices and dispersions of the optical elements in the optical groups 100, 200, 300 and 400 allows for achieving F-theta distortion dependence, monochromatic and chromatic aberrations correction of the lens 2, and high resolution at the image plane, while having a wide angle of FOV and the desired distance from the cold shield to the image plane.

The F# of this F-theta high resolution lens is 2 and the FOV is 74° vertical×144° horizontal. The overall length of the lens is about 250 mm. This embodiment is very compact and utilizes only two optical materials.

Figure 5:
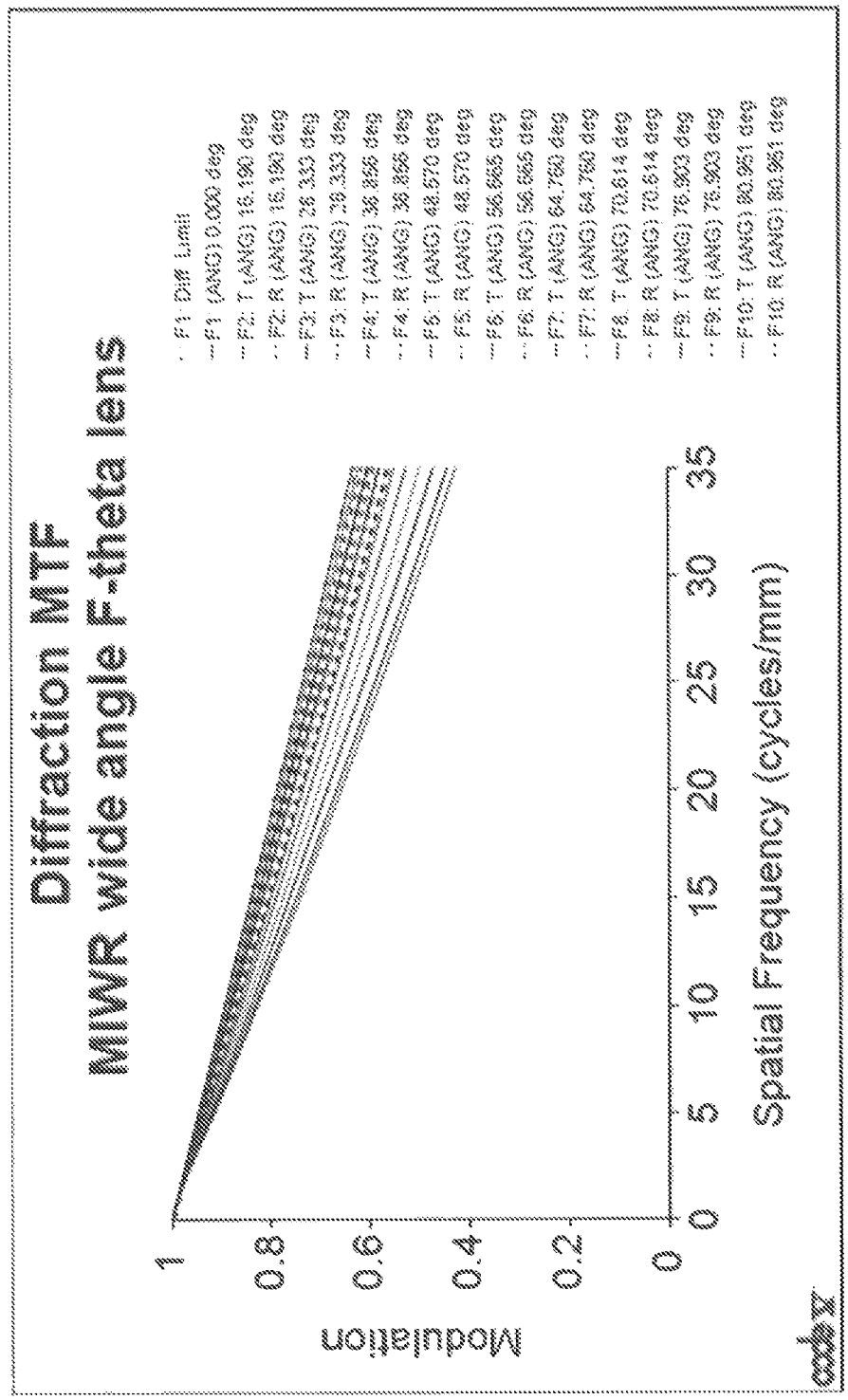
FIG. 5 shows modulation transfer function data for the second embodiment.

The MTF for the embodiment of found in FIG. 4 is presented in FIG. 5. A table listing properties of optical elements for the second embodiment is presented below.

| Radius | Thickness | Glass |
|---|---|---|
| >OBJ: INFINITY | INFINITY | |
| 1: 100.00000 | 10.000000 | |
| 2: 99.06340 | 5.984927 | GERMMW_SPECIAL |
| 3: 59.71118 | 56.367088 | |
| 4: −436.59030 | 5.995786 | SILICN_SPECIAL |
| 5: 556.40001 | 6.004124 | |

-continued

| Radius | Thickness | Glass |
|---|---|---|
| Aspherical surface: | | |
| K: 0.000000 | | |
| A: 0.416990E−07; B: −0.131313E−10; C: 0.169287E−14; D: −0.289041E−18 | | |
| 6: 108.34544 | 14.948203 | GERMMW_SPECIAL |
| 7: 264.58144 | 28.440579 | |
| 8: −428.24644 | 5.000327 | SILICN_SPECIAL |
| Aspherical surface | | |
| A: −0.139674E−05; B: −0.193969E−09; C: 0.102012E−12; D: −0.436012E−16 | | |
| 9: −333.62813 | 12.343632 | |
| 10: 142.74335 | 10.381606 | SILICN_SPECIAL |
| Aspherical surface | | |
| K: 0.000000 | | |
| A: 0.116787E−06; B: −0.172722E−09; C: 0.276199E−13; D: 0.000000E+00 | | |
| 11: −402.44894 | 2.907642 | |
| 12: −940.04125 | 8.975767 | SILICN_SPECIAL |
| 13: −242.37820 | 0.247295 | |
| 14: −974.88552 | 5.997123 | GERMMW_SPECIAL |
| 15: 107.64555 | 3.533594 | |
| 16: −44094.87317 | 6.571891 | SILICN_SPECIAL |
| 17: −113.24470 | 0.100000 | |
| Aperture stop: INFINITY | 76.200000 | |
| IMG: INFINITY | 0.000000 | |

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having", and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A wide angle MWIR F-theta lens comprising in order from an object to an image plane:
    a first optical group having a negative optical power;
    a second optical group having a negative optical power;
    a third optical group having a positive optical power;
    a fourth optical group having a positive optical power;
    a cold shield; and
    a focal plane array;
    wherein the lens is corrected over a spectral waveband of about 5000 nm to about 3300 nm;
    the first optical group is configured to receive light from a remote object and to direct and diverged the received light onto the second optical group; the first optical group includes a single optical element;
    the second optical group is configured to receive the diverged light from the first optical group and to direct the received diverged light from the first optical group onto the third optical group; the second optical group includes two optical elements having in order from the object to the image plane negative optical power and positive optical power;
    the third optical group is configured to receive the diverged light from the second optical group and to direct the received diverged light from the second optical group onto the fourth optical group; the third optical group includes two optical elements having in order from the object to the image plane positive and negative optical powers;
    the fourth optical group is configured to receive the diverged light from the third optical group and converge and focus the received diverged light from the third optical group onto the focal plane; the fourth optical group includes two optical elements having in order from the object to the image plane negative and positive optical power;
    wherein the cold shield is an aperture stop positioned between a last element of the lens and the focal plane; and
    $-0.55<F'1/F'10<-0.45$; and
    $1.75<F'10/F'20<1.95$; and
    $-2.10<F'10/F'30<-1.75$; and
    $-0.95<F'10/F'40<-0.75$; and
    $1.10<n11/n21<1.30$; and
    $1.65<n21/n22<1.35$; and
    $1.05<n31/n32<1.25$; and
    $0.95<n11/n41<1.15$; and
    $0.95<n21/n42<1.15$; and
    $0.35<V11/V21=V41/V42<0.45$; and
    $1.90<V21/V22<2.25$; and
    $0.70<V22/V31<0.90$; and
    $0.75<V31/V32<0.95$; and
    $2.60<OAL/CSD<2.75$;
    wherein:
    F'1 is a focal length of the lens;
    F'10, F'20, F'30 and F'40 are focal lengths of the first, the second, the third and the fourth optical groups;
    n11 is a refractive index for a first element of the first optical group;
    n21 and n22 are refractive indices for a first and a second optical element of the second optical group;
    n31 and n32 are refractive indices for a first and a second optical element of the third optical group;
    n41 and n42 are refractive indices for a first and a second optical element of the fourth optical group;
    V11 is an Abbe number for the first optical element of the first optical group;
    V21 and V22 are Abbe numbers for the first and second optical elements of the second optical group;
    V31 and V32 are Abbe numbers for the first and second optical elements of the third optical group;
    V41 and V42 are Abbe numbers for the first and second optical elements of the fourth optical group;
    OAL is an overall length of the lens; and
    CSD is a distance from the cold shield to the image plane.

2. The wide angle MWIR F-theta lens according to claim 1, wherein the first optical element of the first optical group is made in a form of a negative meniscus whose concave surface faces toward the image.

3. The wide angle MWIR F-theta lens according to claim 2, wherein a second surface of the first optical element of the first optical group is formed aspherical.

4. The wide angle MWIR F-theta lens according to claim 1, wherein the first optical element of the first optical group is made out of Germanium.

5. The wide angle MWIR F-theta lens according to claim 1, wherein the first optical element of the second optical group is made out of Silicon and the second optical element of the second optical group is made out of ZnS.

6. The wide angle MWIR F-theta lens according to claim 1, wherein the first optical element of the third optical group is made out of CdTe and the second optical element of the third optical group is made out of ZnSe.

7. The wide angle MWIR F-theta lens according to claim 1, wherein the first optical element of the fourth optical group is made out of Germanium and the second optical element of the fourth optical group is made out of Si.

8. The wide angle MWIR F-theta lens according to claim 1, wherein the distance from the cold shield to the image plane is about 75 mm.

9. The wide angle MWIR F-theta lens according to claim 1, wherein the lens has a field of view of about 63° vertical by about 126° horizontal.

10. The wide angle MWIR F-theta lens according to claim 1, wherein the lens has an F # of 2.

* * * * *